United States Patent
Lever

(10) Patent No.: US 6,187,456 B1
(45) Date of Patent: Feb. 13, 2001

(54) METHOD OF INHIBITING COLOR CHANGE IN A PLASTIC ARTICLE COMPRISING SILVER-BASED ANTIMICROBIALS

(75) Inventor: John G. Lever, Spartanburg, SC (US)

(73) Assignee: Milliken & Company, Spartanburg, SC (US)

(*) Notice: Under 35 U.S.C. 154(b), the term of this patent shall be extended for 0 days.

(21) Appl. No.: 09/289,241

(22) Filed: Apr. 9, 1999

(51) Int. Cl.$^7$ ........................................... B32B 1/00
(52) U.S. Cl. ........................ 428/688; 264/331.11
(58) Field of Search ........................... 428/195, 688; 264/239, 331.11

(56) References Cited

U.S. PATENT DOCUMENTS

| | | | |
|---|---|---|---|
| 4,938,955 | 7/1990 | Niira et al. | 424/79 |
| 5,405,644 | 4/1995 | Ohsumi et al. | 427/2.31 |
| 5,614,568 | * 3/1997 | Mawatari et al. | 523/122 |
| 5,741,526 | * 4/1998 | Miyata | 424/635 |
| 5,750,609 | 5/1998 | Nosu et al. | 524/413 |
| 5,925,256 | * 7/1999 | Strauel | 210/724 |
| 6,013,275 | * 1/2000 | Konagaya et al. | 424/443 |

FOREIGN PATENT DOCUMENTS

186180 * 7/2000 (JP).

OTHER PUBLICATIONS

Billmeyer, Jr. et al., Principles of Color Technology, pp. 62–64 and 101–104, John Wiley & Sons, Inc. (1981).
Kyowa Checmical Industry Co., Ltd. Pamphlet on DHT–4A [Hydrotalcite–like Compound] (date unknown).

* cited by examiner

Primary Examiner—Bruce H. Hess
Assistant Examiner—B. Shewareged
(74) Attorney, Agent, or Firm—Terry T. Moyer; William S. Parks

(57) ABSTRACT

This invention relates to improvements in inhibiting undesirable discoloring of plastic articles within which silver-based antimicrobials have been introduced. Such a method requires the utilization of very low amounts of acid scavengers or stabilizers such as aluminum-magnesium hydroxycarbonate, otherwise known as hydrotalcite (and not a zinc-based compound). Such hydrotalcites are very low in cost, easy to handle, and, utilized in very low levels in combination with a silver-based antimicrobial within a plastic composition, surprisingly substantially prohibits the generation of unwanted aesthetically displeasing colors.

6 Claims, No Drawings

METHOD OF INHIBITING COLOR CHANGE IN A PLASTIC ARTICLE COMPRISING SILVER-BASED ANTIMICROBIALS

FIELD OF THE INVENTION

This invention relates to improvements in inhibiting undesirable discoloring of plastic articles within which silver-based antimicrobials have been introduced. Such a method requires the utilization of very low amounts of compound which acts as both an acid scavenger and a stabilizer of the silver ions. The preferred acid scavenger/silver stabilizer compound is aluminum-magnesium hydroxycarbonate, otherwise known as hydrotalcite. Such hydrotalcites are very low in cost, easy to handle, and, when utilized in very low levels in combination with a silver-based antimicrobial within a plastic composition, surprisingly substantially prohibits the generation of unwanted aesthetically displeasing colors.

DISCUSSION OF THE PRIOR ART

There has been a great deal of attention in recent years given to the hazards of bacterial contamination from potential everyday exposure. Noteworthy examples of such concern include the fatal consequences of food poisoning due to certain strains of *Eschericia coli* being found within undercooked beef in fast food restaurants; Salmonella contamination causing sicknesses from undercooked and unwashed poultry food products; and illnesses and skin infections attributed to *Staphylococcus aureus*, yeast, and other unicellular organisms. With such an increased consumer interest in this area, manufacturers have begun introducing antimicrobial agents within various household products and articles.

Silver-containing inorganic microbiocides have recently been developed and utilized as antimicrobial agents on and within a plethora of different substrates and surfaces. In particular, such microbiocides have been adapted for incorporation within plastic compositions and fibers in order to provide household and consumer products which inherently exhibit antimicrobial characteristics. Although such silver-based agents provide excellent antimicrobial properties within plastic articles, and the like, aesthetic problems have been found to be a frequent problem. This is believed to be due to several causes, all with their root in the inherent photo-instability of silver ions. The formation of colored species of silver metals discolors the plastic composition which, again from an aesthetic perspective, is highly undesirable. Thus, there has been a need to provide a method of introducing silver-based antimicrobial agents within plastic compositions which substantially reduces the degree of unwanted discoloration within the resultant article due to silver metal contamination.

Past methods have included the addition of benzotriazoles, as in U.S. Pat. No. 5,405,644 to Ohsumi et al., and triazoles and stabilizers (such as metal stearate acid scavengers), as in U.S. Pat. No. 4,938,955 to Niira, deceased et al. However, these methods have proven to be costly (with the high expense of benzotriazoles initially), particularly since relatively high concentrations of the expensive stabilizing compounds are required. Also, as these stabilizers are not thermally stable, they introduce additional processing complications. As such, there is no teaching or fair suggestion within the prior art which pertains to the improvement in methods of inhibiting color change (discoloration) of plastic articles comprising silver-based antimicrobials utilizing an aluminum-magnesium hydrotalcite in an amount of from 0.001 to about 0.2% of the total plastic composition.

DESCRIPTION OF THE INVENTION

It is thus an object of the invention to provide an improved method of inhibiting discoloration of plastic articles comprising silver-based antimicrobial agents. A further object of the invention is to provide a compound which acts as both an acid scavenger and a silver-based antimicrobial complex stabilizer within a plastic composition. Another object of the invention is to provide an aesthetically pleasing plastic article exhibiting excellent antimicrobial properties. Yet another object of this invention is to provide a cost effective method of inhibiting color change within a plastic composition due to degradation of silver-based antimicrobial complexes.

Accordingly, this invention encompasses a plastic article comprising a silver-based antimicrobial agent and an aluminum magnesium hydrotalcite wherein said hydrotalcite is present in an amount of from about 0.001 to about 0.2% of the total weight of the plastic article. Also, this invention encompasses a method of inhibiting color change in a plastic composition or article comprising a silver-based antimicrobial complex, said method comprising the step of introducing an aluminum magnesium hydrotalcite within a molten thermoplastic resin composition and molding said resultant thermoplastic/hydrotalcite composition into a plastic article, wherein the concentration of said hydrotalcite within said plastic article is from about 0.001 to about 0.2% of the total weight of said plastic article. Nowhere within the prior art has such a specific plastic article or method of making thereof been disclosed, utilized, or fairly suggested to produce an antimicrobial article which is resistant to color change due to degradation of the silver-based antimicrobial complex.

The closest art, U.S. Pat. No. 5,750,609 to Nosu et al., discloses an ultraviolet protective agent for incorporation within a variety of compositions, such as films, fibers, cosmetics, and the like. Patentees' protective agent is a zinc-based hydrotalcite which acts solely as an ultraviolet absorber; must be present in an amount of at least 1% of the total target composition; and must contain a zinc component (which increases the cost of such a compound considerably from a mere aluminum magnesium compound). The hydrotalcite encompassed within this invention expressly does not include a zinc-based compound. Furthermore, such a zinc compound must be present in such high concentrations in order to act effectively as an ultraviolet blocking agent; in lower proportions, there would not be sufficient amounts of this compound to provide such desired UV absorbing results. Thus, no disclosures exist which either teach or fairly suggest the specific antimicrobial plastic articles and methods of making such now discussed.

Any plastic in which a silver-based antimicrobial agent may be properly incorporated can be utilized in this invention. For instance, and without intending any limitations therein, polyolefins, such as polyethylene, polypropylene, and polybutylene, halogenated polymers, such as polyvinyl chloride, polyesters, such as polyethylene terephthalate, polyamides, such as nylon 6 and nylon 6,6, polyurethanes, and the like, may be utilized within this invention. Preferably, the plastic is a thermoplastic which can be molded into different shapes and sizes upon extrusion a molding with the silver-based antimicrobial and the hydrotalcite compounds. Thus, polyolefins, particularly polypropylene, and polyesters, particularly polyethylene terephthalate are preferred. Furthermore, such plastics preferably may be colored to provide other aesthetic features for the end user. Thus, the plastic may also comprise colorants, such as, for example, poly(oxyalkylenated) colorants, pigments, dyes, and the like, too. Other additives may also be present, including antistatic agents, brightening compounds, nucleating agents, clarifying agents, antioxidants, UV stabilizers, fillers, and the like.

The preferred silver-based antimicrobial is a silver zirconium phosphate available from Toagasei Chemical Industry Co., Ltd., under the tradename NOVARON®, although any silver-containing antimicrobial which is susceptible to discoloration from the presence of silver metals from dissociation from a complex or from acid scavengers may also be utilized within the inventive plastic article (for instance, as merely an example, a silver substituted zeolite available from Shingawa under the tradename ZEOMIC® AJ). Generally, such an antimicrobial is added in an amount of from about 0.01 to 10% by total weight of the target plastic composition; more preferably from about 0.05 to about 2.0%; and most preferably from about 0.1 to about 1.0%.

The all-important hydrotalcite compound, which must be an aluminum magnesium hydrotalcite, is available from Kyowa Chemical Industry Co., Ltd, under the tradename DHT-4A. Such a compound conforms generally to the following formula (I)

$$[Mg_aAl_b(OH)_cCO_3 \cdot XH_2O] \quad (I)$$

wherein a is from 3 to 8, b is from 1 to 4, c is from 10 to 20, and X is from 1 to 10. Preferably a is about 4.5, b is about 2, c is about 13, and X is about 4.

As noted below, the basic procedures followed in producing the inventive antimicrobial plastic article comprise standard plastic formation techniques. There are two basic methods of incorporating additives (such as silver-based antimicrobials and the inventive aluminum magnesium hydrotalcites, for example) within polymer articles. One method is to dry blend a mixture of polymer, additives, antimicrobials, and hydrotalcite; melt the dry mix together in an extruder to form a molten composition which is then pelletized; and melting and subsequently molding such pellets into a plastic article. Alternatively, one may mix conventional resin pellets and a masterbatch concentrate containing the antimicrobial and hydrotalcite additives and molding in conventional molding equipment. The aforementioned molding steps may be performed preferably with injection molding equipment; however, other plastic-forming operations may also be utilized such as, and without limitation, blow molding, fiber extrusion, film formation, compression molding, rotational molding, and the like. These alternative plastic article-forming operations would be well understood and appreciated by one of ordinary skill in this art.

Preferably, the admixture of, for example, from about 0.01 to about 5% (by weight of the polymer composition) of a silver-based antimicrobial (NOVARON® from Toagasei, as noted above; preferably from about 0.1 to about 2% by weight) with the thermoplastic resin (such as, preferably polypropylene) within an injection molding machine (such as an Arburg Molder). Also, the preferred hydrotalcite is added to the polymer/antimicrobial formulation in an amount of from about 0.001 to about 0.2% by weight of the entire formulation; preferably from about 0.01 to about 0.1% by weight; most preferably from about 0.02 to about 0.06%.

DESCRIPTION OF THE PREFERRED EMBODIMENT

The following examples are indicative of the preferred embodiment of this invention:

Color Change Analyses

EXAMPLE 1

A plastic article was produced as follows: 993.5 grams of homopolymer polypropylene were admixed with 5.0 grams of a silver zirconium phosphate antimicrobial compound (NOVARON® AG300, from Toagasei), 0.8 grams of a phenolic antioxidant (Irganox® 1010, from Ciba-Geigy), 0.5 grams of a phosphorus antioxidant (Irganox® 168, from Ciba-Geigy), and 0.2 grams of hydrotalcite (DHT-4A™, from Kyowa Chemical), melted and mixed together in a single screw extruder to form pellets. These pellets were then subsequently gravity fed in to an Arburg injection molding machine, melted, and molded into a plastic plaque.

EXAMPLE 2 (Comparative)

A comparable plastic article was prepared in accordance with the method and composition of EXAMPLE 1 except that 992.9 grams of homopolymer polypropylene were utilized and the hydrotalcite was replaced with 0.8 grams of calcium stearate. The resultant article was also extruded into a plaque form.

These two plaques from EXAMPLES 1 and 2 were then compared for color change after 40 hours of exposure to a xenon arc light source. The color difference between the initial plastic formed and plastic that was exposed to a xenon arc light source for 40 hours was calculated for each plaque using the following equation:

$$\Delta E^* = ((L^*_{initial} - L^*_{aged})^2 + (a^*_{initial} - a^*_{aged})^2 + (b^*_{initial} - b^*_{aged})^2)^{1/2}$$

wherein $\Delta E^*$ represents the difference in color between the initial plaque and the exposed plaque. $L^*$, $a^*$, and $b^*$ are the color coordinates; wherein $L^*$ is a measure of the lightness and darkness of the plaque; $a^*$ is a measure of the redness or greenness of the plaque; and $b^*$ is a measure of the yellowness or blueness of the plaque. For a further discussion and explanation of this testing procedure, see Billmeyer, F. W., et al., *Principles of Color Technology*, 2nd Edition, pp. 62–64 and 101–04. Thus, color change was measured as $\Delta E$; a low measurement indicated low color change (and thus low degrees of unwanted discoloration). The results for the $\Delta E$ measurements of these comparative compositions were 0.53 for the plaque of EXAMPLE 1 and 11.02 for EXAMPLE 2. Thus, clearly, the hydrotalcite of EXAMPLE 1 provided improved color change characteristics in comparison with the standard composition of EXAMPLE 2.

Yellowness Analyses

EXAMPLE 3

A plastic article was produced in accordance with the method outlined above in EXAMPLE 1. 994.8 grams of low density polyethylene (LDPE) were admixed with 5.0 grams of a silver zirconium phosphate antimicrobial compound (NOVARON® AG300, from Toagasei), and 0.2 grams of hydrotalcite (DHT-4A™, from Kyowa Chemical), melted and mixed together, and extruded to form a plaque.

EXAMPLE 4

A plastic article was produced in accordance with the method outlined above in EXAMPLE 1. 994.8 grams of low density polyethylene (LDPE) were admixed with 5.0 grams of a silver substituted zeolite antimicrobial compound (ZEOMIC® AJ, from Shingawa), and 0.2 grams of hydrotalcite (DHT-4A™, from Kyowa Chemical), melted and mixed together, and extruded to form a plaque.

EXAMPLE 5 (Comparative)

A comparable plastic article was produced in accordance with the method outlined above in EXAMPLE 1. 994.5 grams of low density polyethylene (LDPE) were admixed with 5.0 grams of a silver zirconium phosphate antimicrobial compound (NOVARON® AG300, from Toagasei), and 0.5 grams of sodium stearate, melted and mixed together, and extruded to form a plaque.

EXAMPLE 6 (Comparative)

A comparable plastic article was produced in accordance with the method outlined above in EXAMPLE 1. 994.5 grams of low density polyethylene (LDPE) were admixed with 5.0 grams of a silver substituted zeolite antimicrobial compound (ZEOMIC® AJ, from Shingawa), and 0.5 grams of sodium stearate, melted together, and extruded to form a plaque.

EXAMPLE 7 (Comparative)

A plaque was produced in accordance with the extrusion method noted above in EXAMPLE 1 comprised of 1,000 grams of LDPE.

The plaque of EXAMPLES 3 through 7 were then tested to measure the change in yellowness of each plaque from formation upon atmospheric exposure for 20 hours. Yellowness is measured by the change in the variable $b^*$ of the aforementioned $\Delta E$ (color change) formula. The lower the recorded $b^*$, the better the result in discoloration. The results are tabulated below:

TABLE

| EXAMPLE | Yellowness |
|---------|------------|
| 3 | −1.04 |
| 4 | −0.81 |
| 5 | 10.54 |
| 6 | 2.34 |
| 7 | −1.54 |

Clearly, the best results are obtained through the utilization of LDPE alone, but there is no antimicrobial present to provide such properties to the plastic. Thus, upon utilization of the hydrotalcite-containing plastic of the instant invention, in combination with a silver-based antimicrobial, the lowest overall degree of yellowness is obtained, thereby providing the most pleasing aesthetic plastic article from a non-yellowing perspective.

There are, of course, many alternative embodiments and modifications of the present invention which are intended to be included within the spirit and scope of the following claims.

What I claim is:

1. A plastic article comprising a plastic material, a silver-based antimicrobial agent and an aluminum magnesium hydrotalcite wherein said hydrotalcite is present in an amount of from about 0.001 to about 0.2% of the total weight of the plastic article.

2. The plastic article of claim 1 wherein said hydrotalcite is present in an amount of from about 0.01 to about 0.1% of the total weight of the plastic article.

3. The plastic article of claim 2 wherein said hydrotalcite is present in an amount of from about 0.02 to about 0.06% of the total weight of the plastic article.

4. A method of inhibiting color change in a plastic composition or article comprising a silver-based antimicrobial complex, said method comprising the step of introducing an aluminum magnesium hydrotalcite within a molten thermoplastic resin composition and molding said resultant thermoplastic/hydrotalcite composition into a plastic article, wherein the concentration of said hydrotalcite is from about 0.001 to about 0.1% of the total weight of said plastic article.

5. The method of claim 4 wherein said hydrotalcite is present in an amount of from about 0.01 to about 0.1% of the total weight of the plastic article.

6. The method of claim 5 wherein said hydrotalcite is present in an amount of from about 0.02 to about 0.06% of the total weight of the plastic article.

* * * * *